J. C. CROMWELL.
UNIVERSAL MILL.
APPLICATION FILED JULY 6, 1914.

1,163,975.

Patented Dec. 14, 1915.
12 SHEETS—SHEET 1.

WITNESSES
R. A. Balderson
Geo. L. Robinson.

INVENTOR
Jno. C. Cromwell,
by Bakewell, Byrnes & Parmelee
Attys

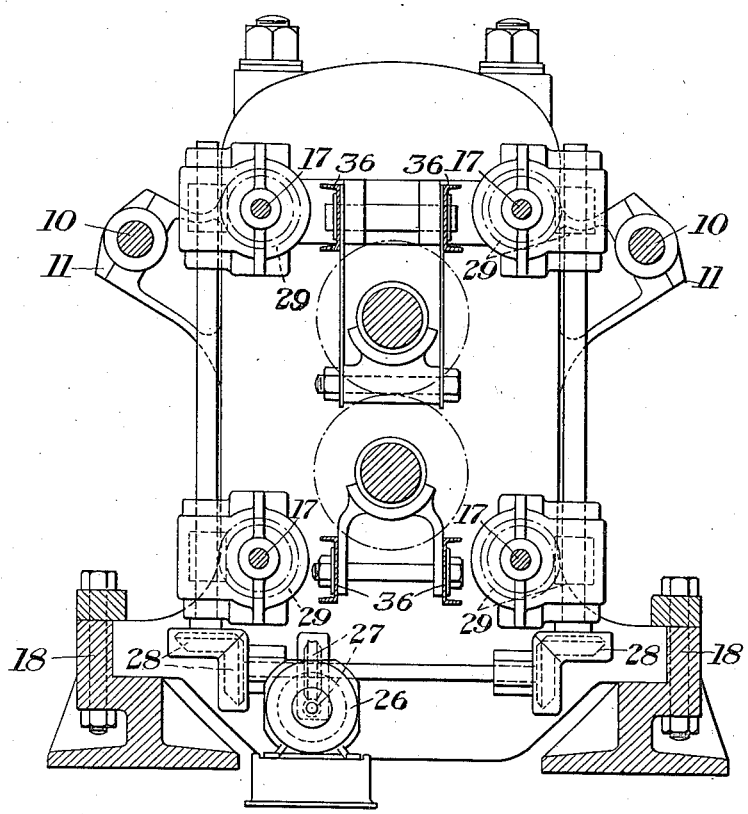

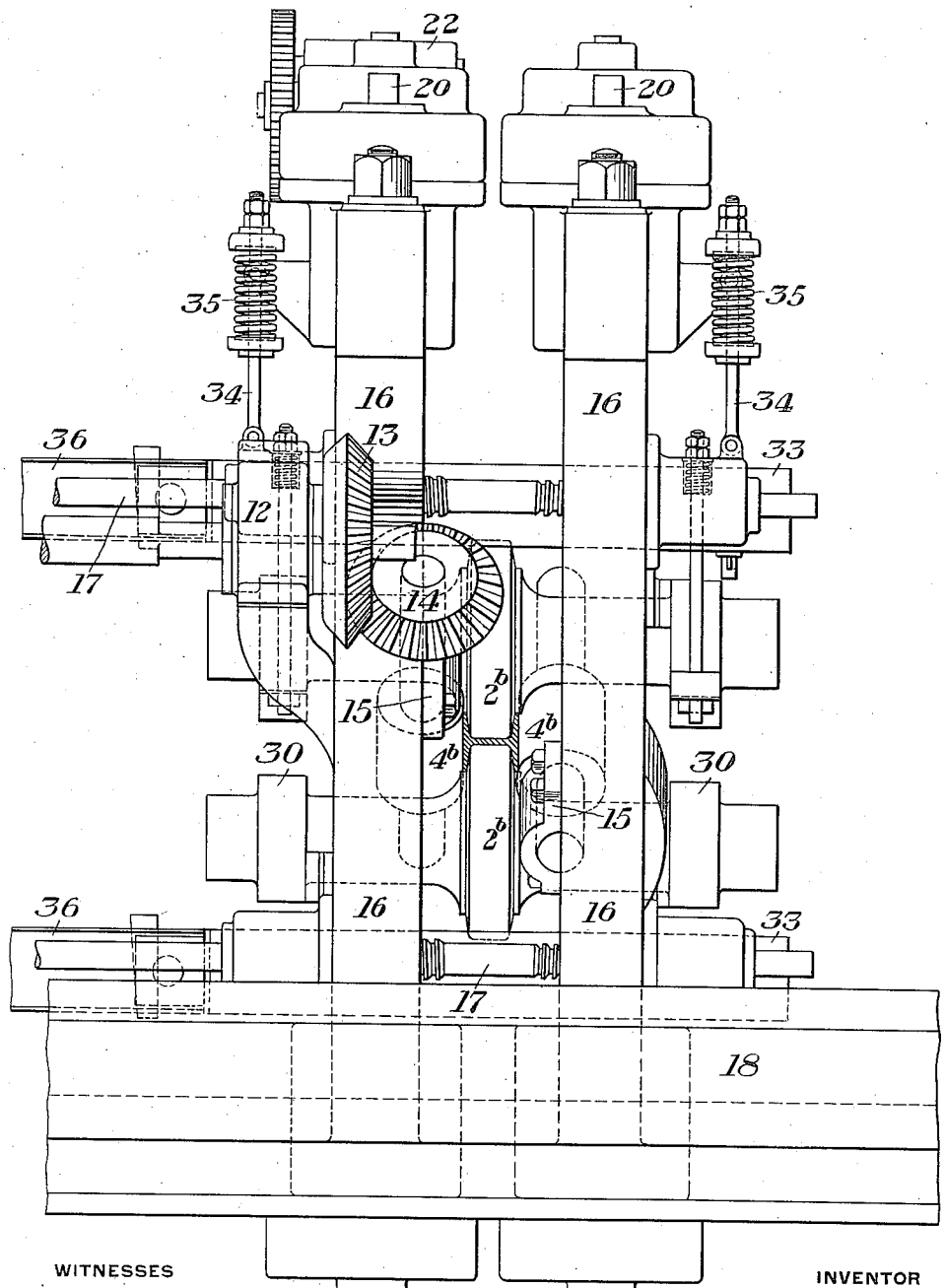

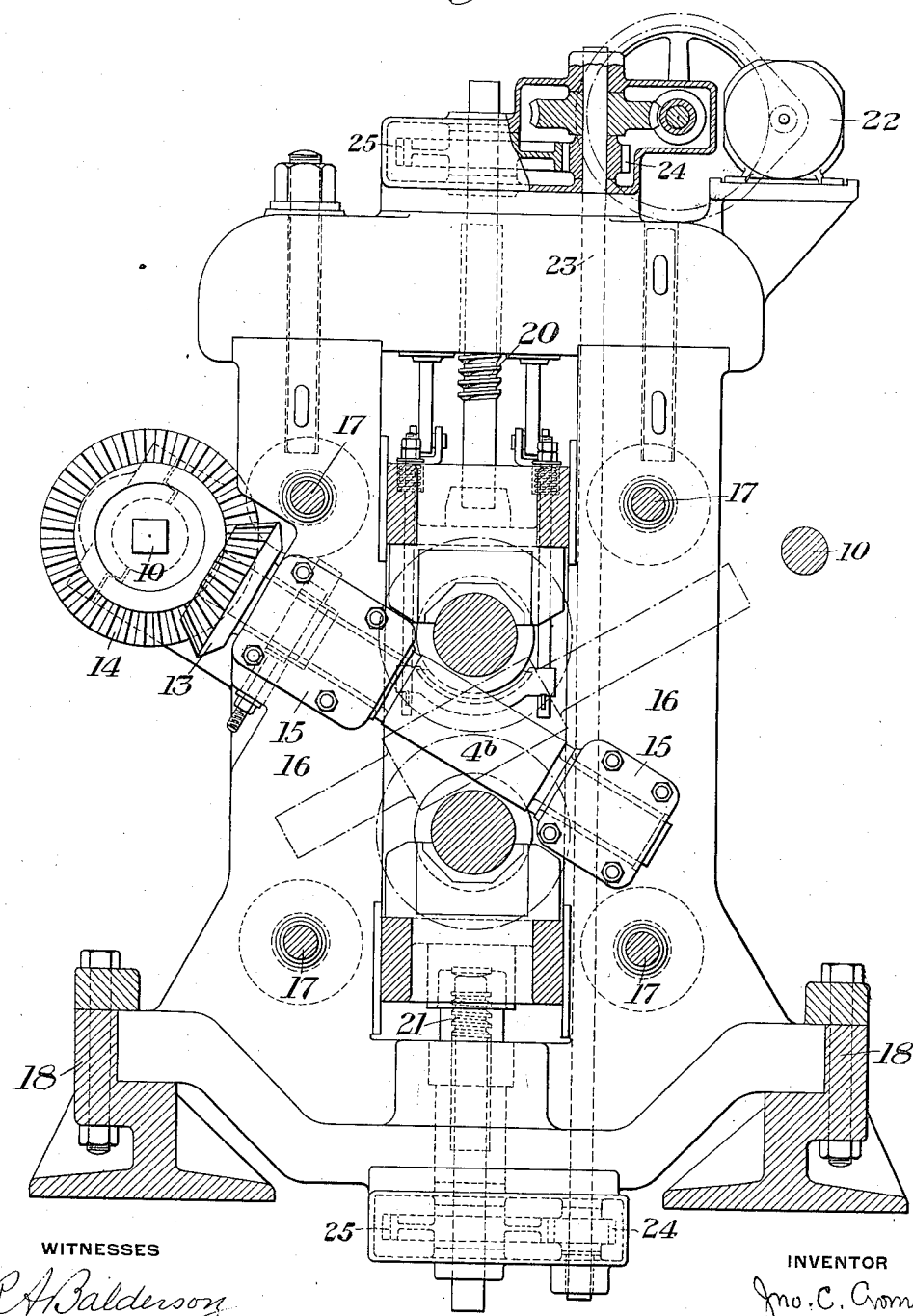

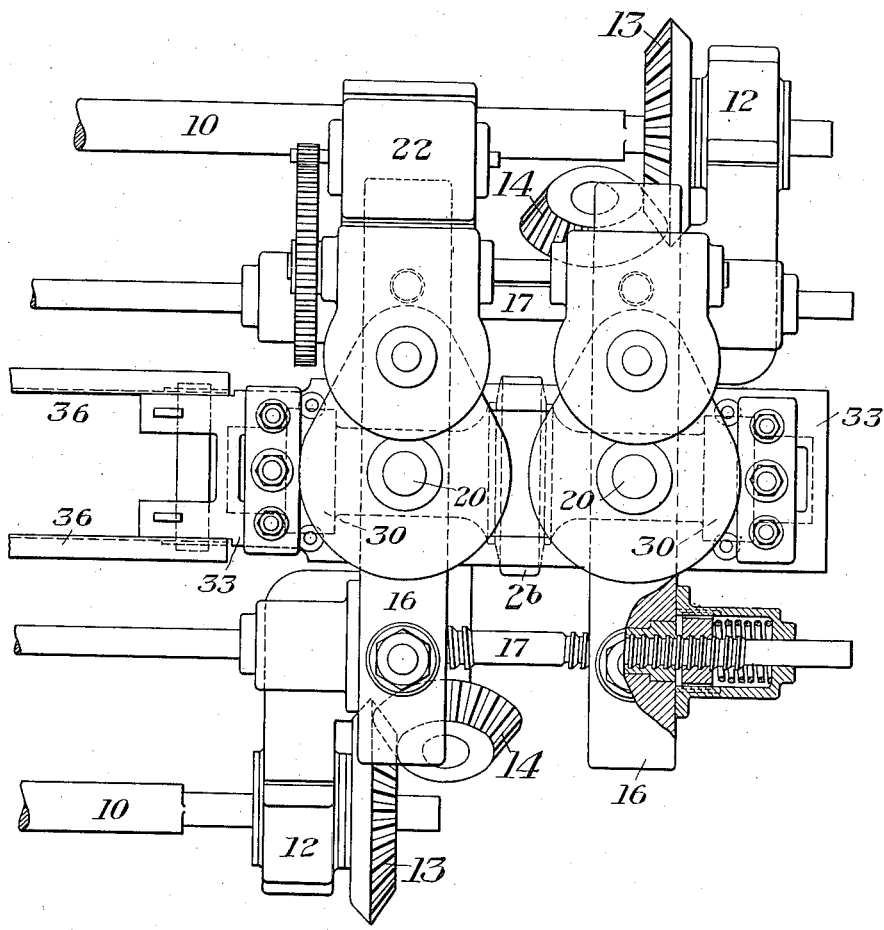

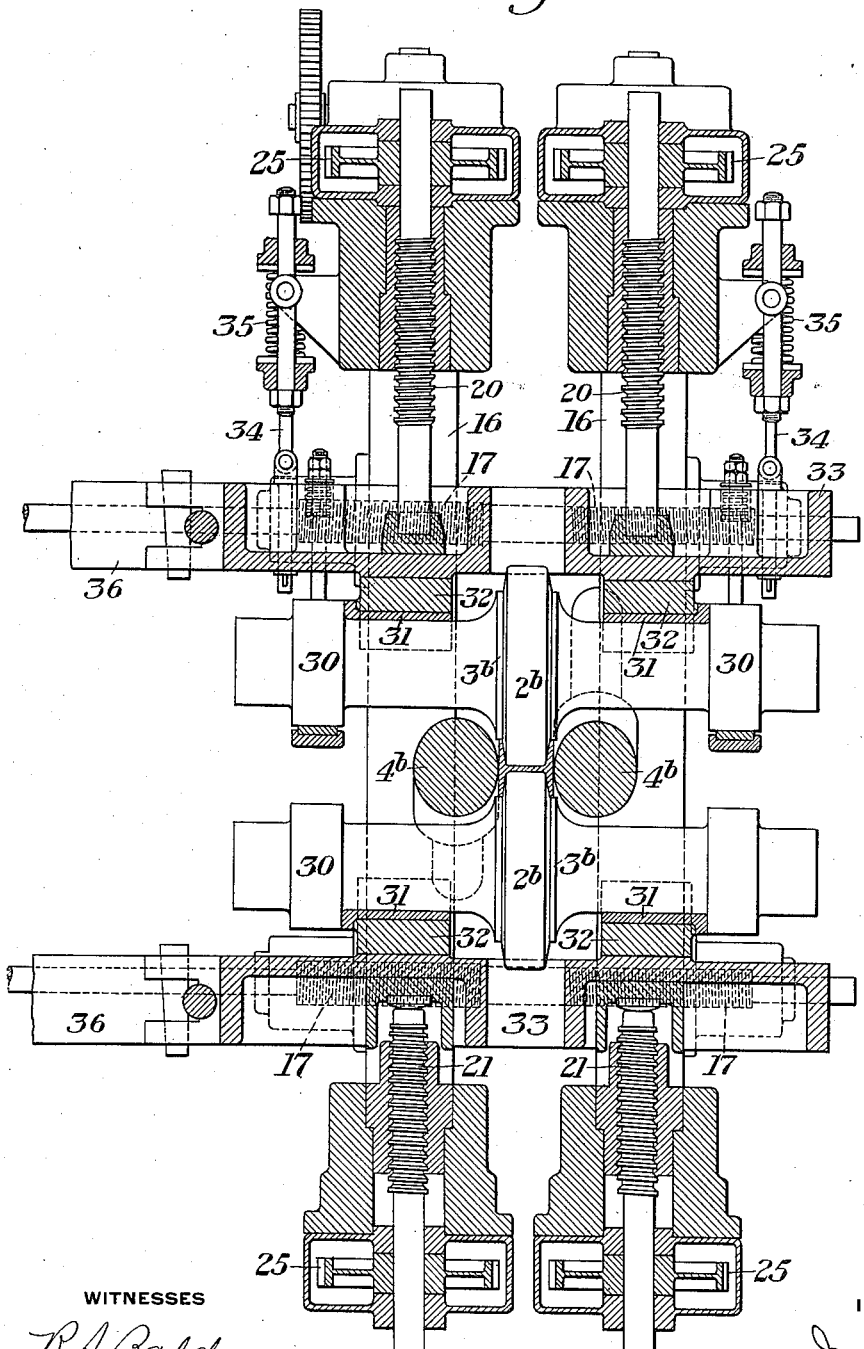

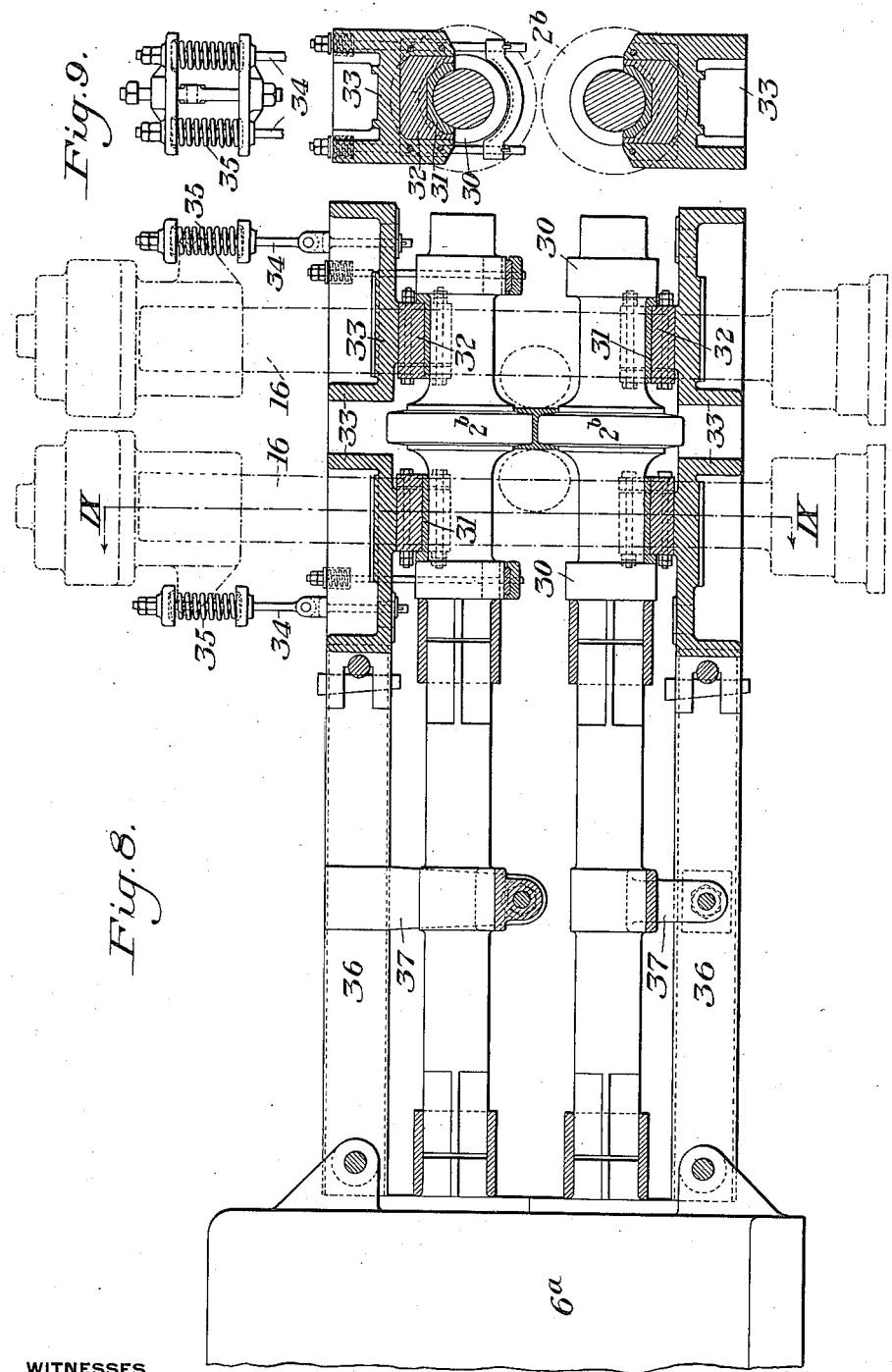

J. C. CROMWELL.
UNIVERSAL MILL.
APPLICATION FILED JULY 6, 1914.
1,163,975.
Patented Dec. 14, 1915.
12 SHEETS—SHEET 8.
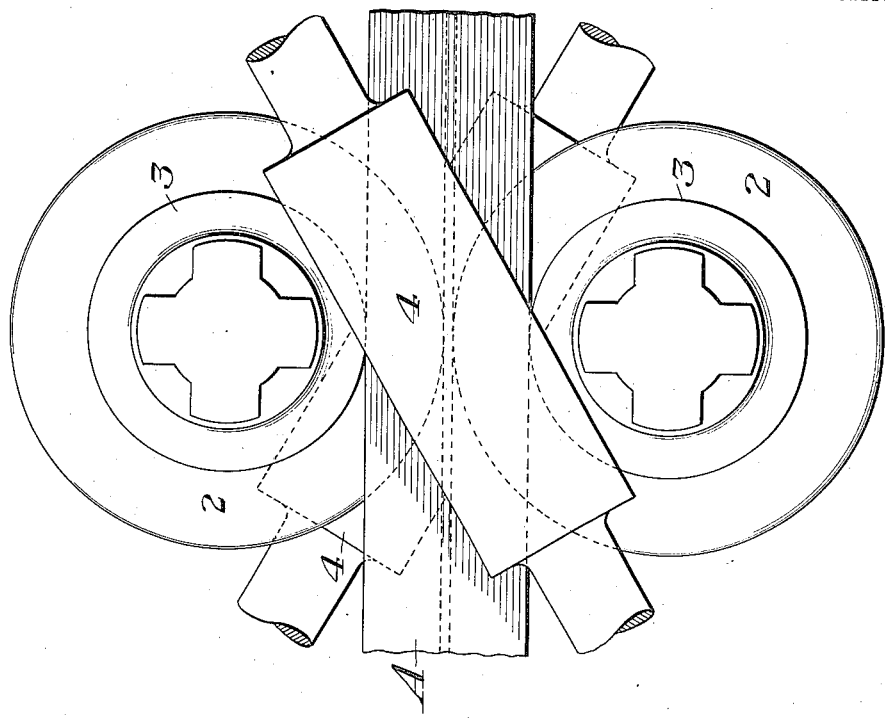
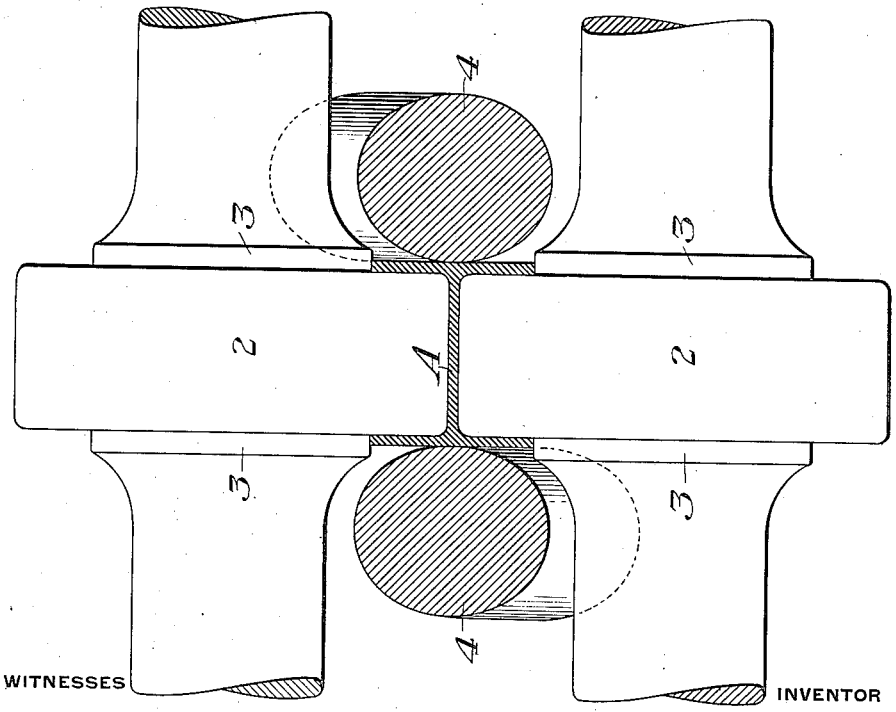

J. C. CROMWELL.
UNIVERSAL MILL.
APPLICATION FILED JULY 6, 1914.
1,163,975.
Patented Dec. 14, 1915.
12 SHEETS—SHEET 9.
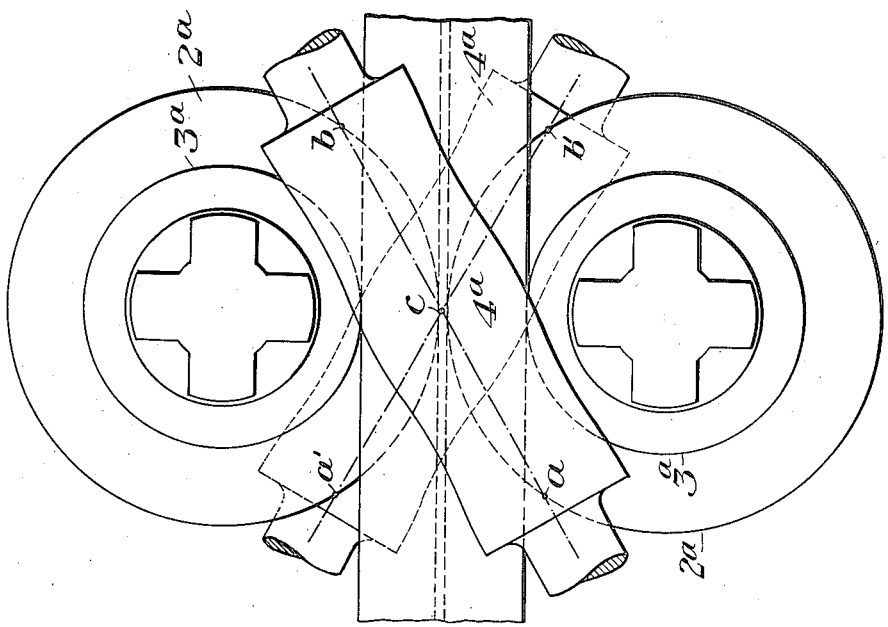
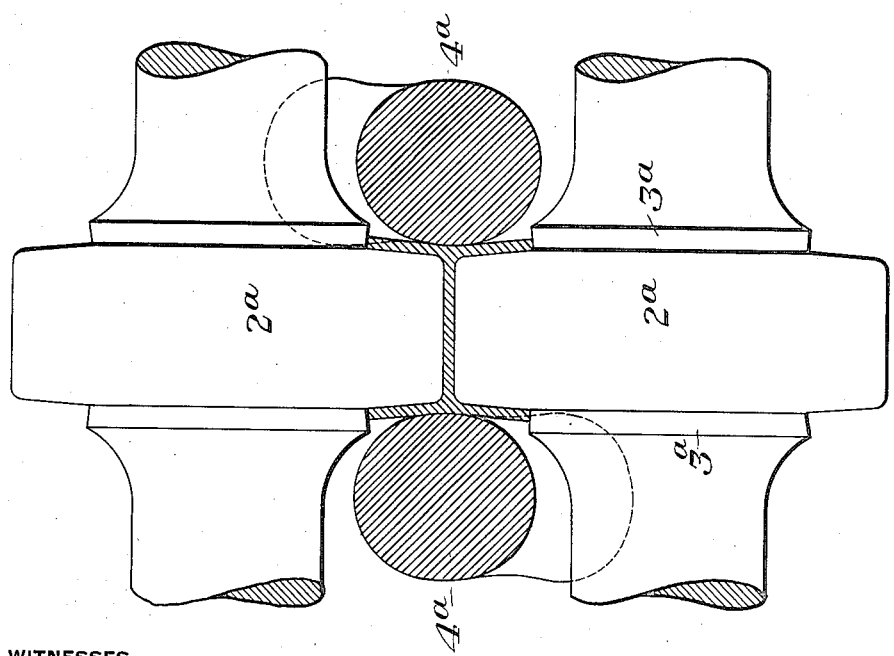
WITNESSES
R A Balderson
Geo. L. Robinson.
INVENTOR
Jno. C. Cromwell,
by Bakewell, Byrnes Parmelee,
Attys.

J. C. CROMWELL.
UNIVERSAL MILL.
APPLICATION FILED JULY 6, 1914.
1,163,975.
Patented Dec. 14, 1915.
12 SHEETS—SHEET 10.
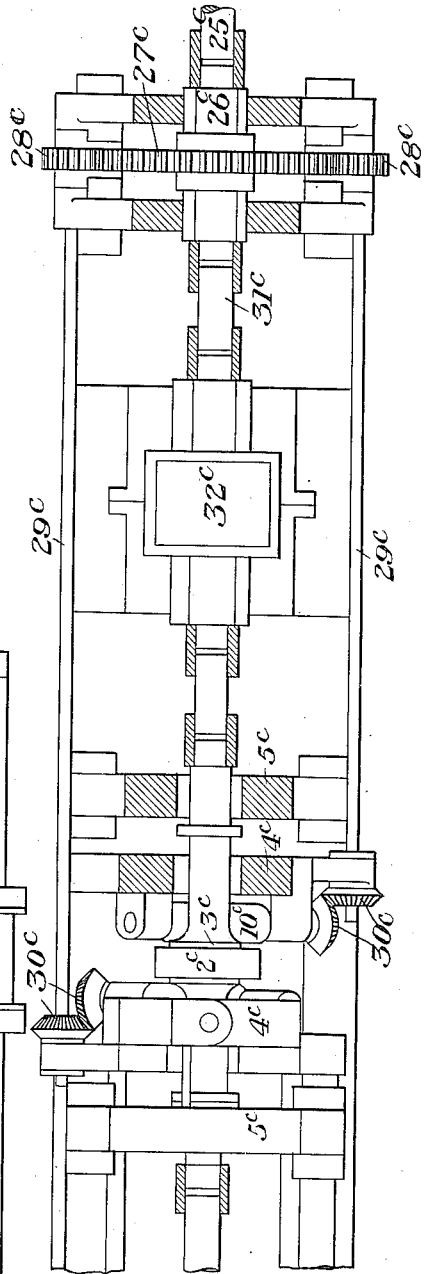
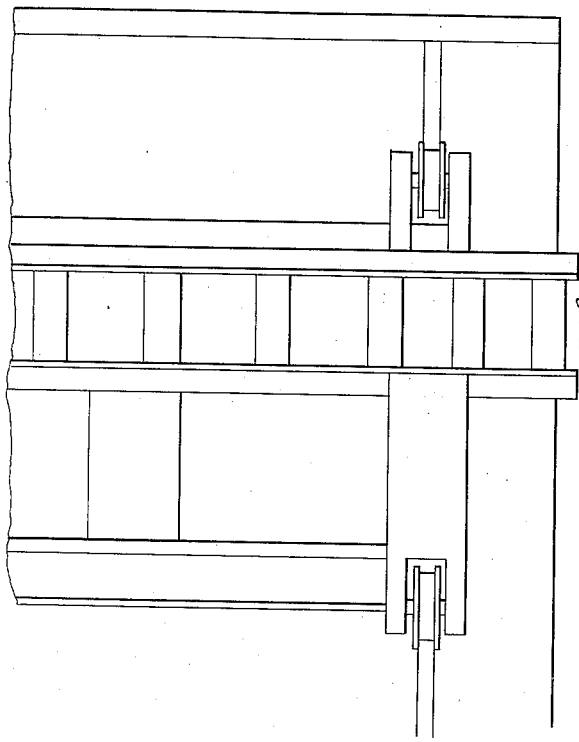
Fig. 14.
WITNESSES
R. H. Balderson
Geo. L. Robinson
INVENTOR
Jno. C. Cromwell,
by Bakewell, Byrnes & Parmelee
Attys.

J. C. CROMWELL.
UNIVERSAL MILL.
APPLICATION FILED JULY 6, 1914.

1,163,975.

Patented Dec. 14, 1915.
12 SHEETS—SHEET 11.

WITNESSES
R. A. Balderson
Geo. L. Robinson

INVENTOR
Jno. C. Cromwell,
by Bakewell Byrnes Parmlee
Attys.

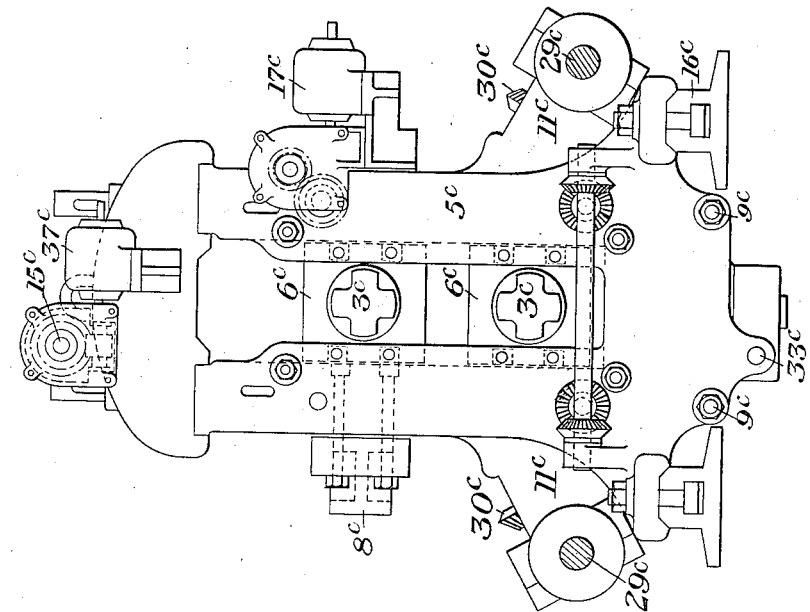

UNITED STATES PATENT OFFICE.

JOHN C. CROMWELL, OF CLEVELAND, OHIO.

UNIVERSAL MILL.

1,163,975. Specification of Letters Patent. Patented Dec. 14, 1915.

Application filed July 6, 1914. Serial No. 849,111.

*To all whom it may concern:*

Be it known that I, JOHN C. CROMWELL, a citizen of the United States, residing at Cleveland, Cuyahoga county, Ohio, have invented a new and useful Universal Mill, of which the following is a full, clear, and exact description, reference being had to the accompanying drawings, in which—

Figure 2:
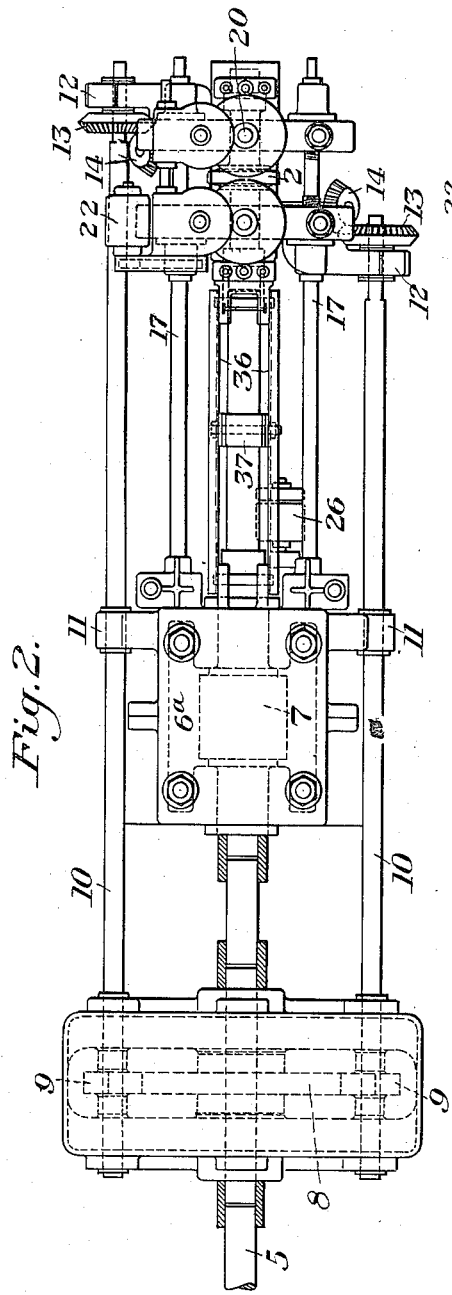
Figure 1:
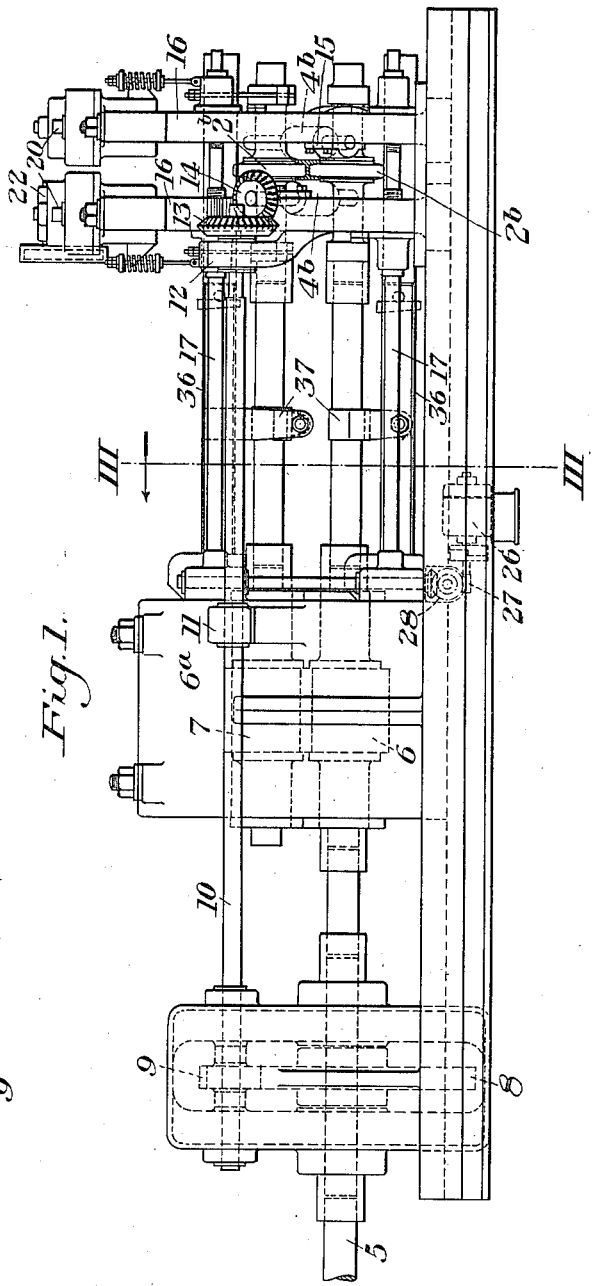
Figure 15:
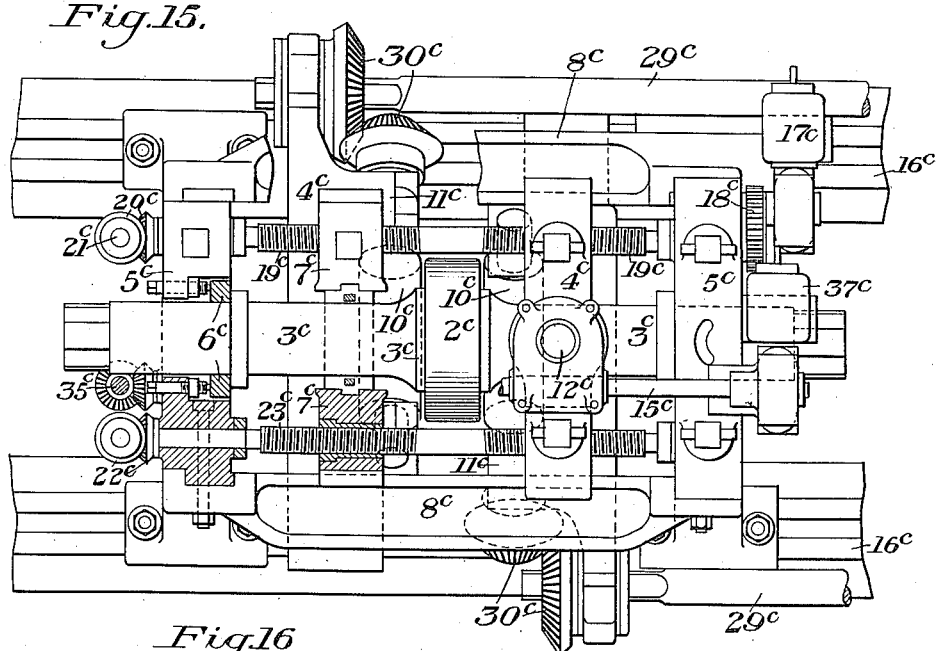
Figure 16:
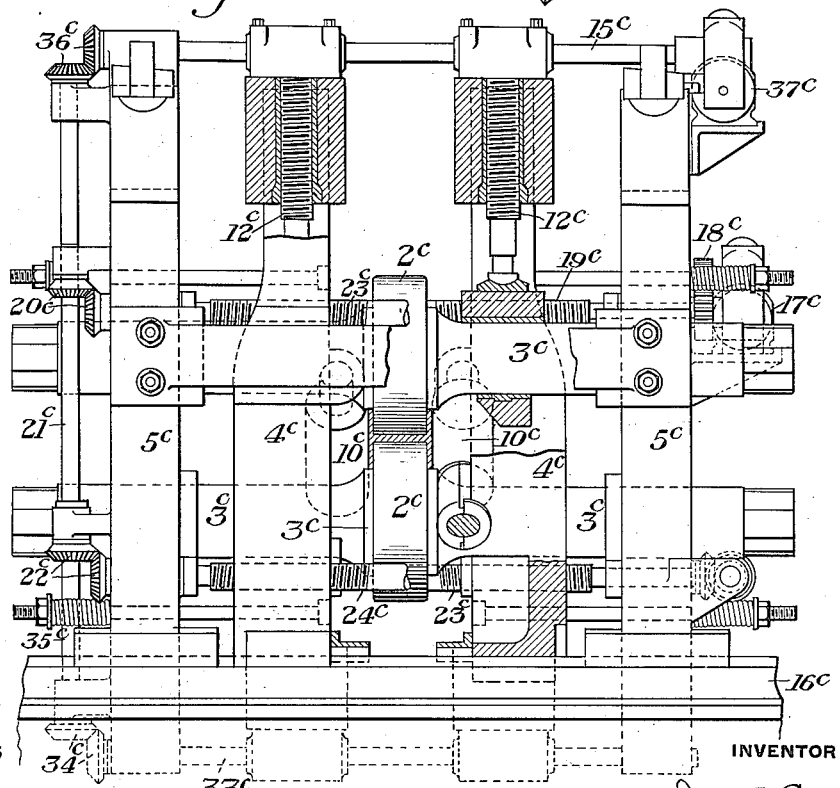

Figure 1 is a side elevation of a universal mill constructed in accordance with my invention. Fig. 2 is a top plan view of the same. Fig. 3 is a cross section on the line III—III of Fig. 1. Fig. 4 is a front elevation of the rolling mill proper, on a larger scale. Fig. 5 is a vertical cross section of the same. Fig. 6 is a top plan view of the mill. Fig. 7 is a transverse section of the mill, the adjusting screws being shown in elevation. Fig. 8 is a sectional front elevation, with the housings shown in dotted lines. Fig. 9 is a section on the line IX—IX of Fig. 8, looking in the direction of the arrow, partly broken away. Figs. 10 and 11 are diagrammatic views showing the theoretical construction involving my invention. Figs. 12 and 13 are views similar to Figs. 10 and 11, showing diagrams of a construction for rolling flared flanges with the side rolls somewhat exaggerated for clearness. Fig. 14 is a plan view showing another mill constructed in accordance with my invention. Fig. 15 is a plan view of the same, partly in section. Fig. 16 is a front elevation of the mill, partly broken away. Fig. 17 is an end elevation, and Fig. 18 is a sectional end elevation with the outer housing removed.

My invention relates to universal rolling mills, and is designed to provide an improved mill of this general type. Heretofore there have been two classes of such mills. First, the class having vertical rolls located on one or both sides of the horizontal rolls and positively driven. This is the common type of mill used for slabbing and universal plate work, where the metal is not rolled into a shape but is simply finished with an approximately square edge. The second class has vertical rolls in endwise alinement with the horizontal rolls. This type of mill is used for rolling shaped material, grooves being provided for this purpose in either the horizontal or vertical rolls. Owing, however, to the position of the vertical rolls between the necks of the horizontal rolls, it has been impossible to positively drive the vertical rolls and provide for their proper adjustment. Hence in practice these vertical rolls have been idler rolls, driven by contact with the metal. In this type the vertical rolls offer side resistance to the piece being rolled and cause strains in the section or shape at the junction between the parts formed by the horizontal and those formed by the vertical rolls. These strains produce serious weakness in these portions of the section.

My invention provides a third and new class of universal mills and comprises positively driven side rolls coacting with the horizontal rolls. These side rolls are positioned so that their axes are inclined to a plane through the axes of the horizontal rolls. This new mill may be used for rolling shapes the same as those of the second class, but as the side rolls are positively driven, the strains produced by the rolls of the second class are not present in the product. This side arrangement also imparts a spreading action to the metal, thereby producing sections of uniform strength and of wider flange than that from which the section is rolled. This feature is very desirable in connection with rolling wide flange I or H section beams and does away with the necessity for deep flanged blanks and the consequent unequal work thereon. At the present time special shaped ingots are cast for the larger sizes of such beams, thus causing extra expense, as compared to the standard ingots which may be used in preparing the blank for my new mill. In this new class of mill I preferably form the horizontal rolls with collars which act upon the edges of the flanges formed and spread by the positively driven side rolls, so as to true up these flanges and give them substantially uniform width.

Referring to Figs. 10 and 11 of the drawings, A is an H-shaped section being formed in my mill, the edges of the flanges being made of substantially uniform width by the collars 3 of the horizontal rolls 2, 2. In this theoretical form the side rolls 4, 4 are true cylinders and the outer faces of the horizontal rolls coöperating with them are vertical, in which case the section of the flange would be of uniform thickness. In practical operation, however, it is necessary to give a slight taper to the bodies of the horizontal rolls in order to provide for clearance, prevent tearing, and make redressing of the rolls practicable. It is also desirable in some cases to produce sections having an unequal contour in the flange. In order to accomplish these results, I vary the contour of the side rolls and thereby make any desired space between the surfaces of these rolls and the coacting outer faces of the horizontal rolls. Thus, in Figs. 12 and 13, I show diagrams of practical working rolls with the housings and driving connections broken away. In these figures, the bodies $2^a$ of the horizontal rolls have tapered sides to give the desired clearance, the collars $3^a$ being present, as in the first theoretical form referred to. The rolling action between the horizontal rolls and the side rolls $4^a$ takes place along the dotted lines $a$—$c$, $b$—$c$, and $a'$—$c$, $b'$—$c$ of Fig. 13, and the distance between the face of the side roll and the side surfaces of the horizontal rolls corresponds to the section of flange desired. In these Figs. 12 and 13, the diameter of the side rolls is greatest at the center and is thence tapered down toward the ends. These side rolls produce two components of work: A horizontal component which elongates the metal; and a vertical component which spreads the flange. I preferably proportion the speed of the side rolls so that the horizontal component of work from these rolls is the same as the horizontal rolling work imparted by the horizontal rolls. As the blank is passed from this mill in one direction, the tendency of the side rolls is to spread metal in the flange upwardly at one side and downwardly at the opposite side, while elongating the blank. As the mill is reversed in the next pass, the same spreading action takes place in the opposite direction, so that in two passes the spreading of the flange metal is equalized.

The preferred form of mill is shown in detail in Figs. 1 to 9, inclusive. As shown in these figures, power is transmitted from the spindle 5, direct to the lower horizontal rolls $2^b$, through the mill pinion 6. This mill pinion 6 intermeshes with an upper mill pinion 7, which transmits power direct to the upper horizontal roll $2^b$. This power is transmitted to the side rolls $4^b$ through the toothed wheel 8 and upper pinions 9, as shown in the left hand portion of Figs. 1 and 2. The upper pinions 9 are secured to shafts 10, extending through bearings 11 and 12, and having bevel wheels 13, intermeshing with bevel wheels 14, secured to the upper ends of the side rolls $4^b$. These rolls $4^b$ are mounted in bearings 15, secured to the roll housings 16, at each side of the windows therein, and the housings are adjustable toward and from each other, this adjustment being obtained by four right and left hand screws 17, extending through internally threaded members in said housings. The housing shoes slide in suitable guides or trackways 18. These housings are provided with top and bottom adjusting screws 20 and 21 of ordinary form, which are operated by a motor 22, mounted at one side of the top cap of the housing, and having slow motion gearing connection with the vertical shaft 23, extending down through the housing, and having pinions 24, intermeshing with toothed wheels 25, secured to the adjusting screws. In this manner, the horizontal rolls are adjusted equally toward and from each other, thus maintaining the center of the pass in the same position. As the side rolls are rigidly journaled to the housings, they are adjusted toward and away from the blank by the adjusting movement of the housings toward and from each other. The four screws which perform these adjustments of the housings are operated by means of a motor 26, which transmits power from the worm wheel 27, and bevel gears 28, to the four worm wheels 29, which operate the four adjusting shafts 17 on which the right and left hand threads are cut. This driving mechanism is shown in Fig. 3.

In order to hold the horizontal rolls against endwise movement during the adjustment of the housings, I provide collars 30, on the outer portions of the horizontal roll shafts, the inside faces of which are in contact with the end of bearings 31. The bearings for the upper horizontal roll are held by chucks 32, which, in turn, are carried by large double chucks 33, supporting both bearings and carried by links 34, depending from spring supports 35, carried on brackets projecting from the housings. These double chucks are fastened at one end to the horizontal links 36 pivotally fastened to the pinion housing $6^a$. In this way, all end movement is taken up and the double chucks are moved in vertical arcs described from a radius equal to the length of the connecting links. The double chucks and the rolls carried thereby are thus free from end movement of the housings which are movable independently thereof. The radial chuck links 36 also act as spindle carriers, and pivoted to them is a support 37, for carrying the centers of the vibrating spindles between the pinions and the horizontal rolls. The double chucks are, however, supported on the movable housings, the lower one resting directly on the housing screws, while the upper one is carried flexibly by the spring connection above described, these springs being arranged to take an angular position and support the rolls in any position to which the housings may be moved during the operation. During the movement of the housings, the caps on the top and bottom screws slide in the double chucks above described, which are suitably recessed for that purpose. The spring connections for the four screws which adjust the housings take up the slack on the threads of the adjusting screw.

In the use of the mill, I preferably take a flat slab of a previously rolled blank and pass it through my improved mill, reversing it therein in the usual manner of universal mills. As the metal passes through, the horizontal rolls exert positive rolling pressures to elongate the metal axially, and the horizontal components of the pressures imparted by the positively driven side rolls also produce an elongating action. At the same time, the spreading action of the side rolls thins and spreads the flanges, this action being equalized in the several back and forth passes. The collars on the horizontal roll bodies act upon the edges of the flanges, although the beam is preferably taken to a finishing mill and given a bull-head pass to straighten the section.

Both the horizontal and the side rolls are adjusted as desired between the passes, the adjustment of the side rolls being obtained by adjusting the housings in the particular form of my invention herein shown, while the horizontal rolls are adjusted independently of the housings by the top and bottom screws.

In Figs. 14 to 18, inclusive, I show another form of mill constructed in accordance with my invention in which four housings are employed. In this form $2^c$, $2^c$ represent the horizontal rolls, the long necks $3^c$, $3^c$ of which extend through inner housings $4^c$, $4^c$, and outer housings $5^c$, $5^c$. Each of these four housings is provided with the usual windows or openings containing bearing blocks for the necks of the horizontal rolls. The blocks $6^c$ in the outer housings are adapted to receive end thrust only, while the bearing blocks $7^c$ of the inner housings are adapted to receive and resist vertical pressures only. The outer housings $5^c$, $5^c$ are tied together by the side tie beam $8^c$, $8^c$ and by the bottom tie rods $9^c$, $9^c$. The side rolls $10^c$, $10^c$, are mounted rigidly in bearings $11^c$, secured to and carried by the inner housings $4^c$, and I have shown these rolls as mounted at an angle of about 30 degrees to a horizontal plane in opposite directions. The horizontal rolls may be adjusted toward and away from each other by various mechanism. In the form shown, the upper bearing blocks $7^c$ are carried by screws $12^c$, extending up through the housing caps, and provided with worm wheels $13^c$, engaging the worm $14^c$, on a shaft $15^c$ connecting this gearing to an electric motor $37^c$. The lower bearing blocks $7^c$ are correspondingly adjusted in the opposite direction to the upper bearing blocks by screws $12^{a-c}$ extending up through the lower parts of the inner housings $4^c$, $4^c$, and engaged by worm gears $13^{a-c}$ and $14^{a-c}$ on a horizontal shaft $33^c$ having bevel gear connection $34^c$ with a vertical shaft $35^c$ outside the outer housings, and having bevel gear connection $36^c$ with the shaft $15^c$ driven by electric motor $37^c$. As the side rolls are mounted in rigid bearings secured to the inner housings, I provide for adjusting these inner housings bodily toward and from each other, their bearing blocks for the horizontal rolls sliding along on the necks of these horizontal rolls during such adjusting. The lower portions of these inner housings slide in suitable guide shoes $16^c$, and the housings are adjusted by means of electric motor $17^c$, through suitable connections. As shown, the motor shaft has a slow motion gearing $18^c$ to a screw shaft $19^c$, having right and left hand screw threads thereon, engaging corresponding inner screw threads in bushings secured in the housings $4^c$. The screw shaft $19^c$ is connected through bevel gear $20^c$ with a vertical shaft $21^c$, which, in turn, is connected by bevel gear $22^c$ with a screw shaft $23^c$, on the same side of the housing as the upper shaft $19^c$, this shaft also having right and left hand screw threads engaging corresponding bushings in the lower parts of the housings. The other side of the housing is provided with a similar set of shafts, the driving connection being obtained through the lower transverse screw shaft $24^c$. By actuating the motor $17^c$, therefore, the four screw shafts are simultaneously actuated, and serve to adjust the inner housings simultaneously toward and from each other. In this form, the drive comes through the spindle $25^c$, connected to a shaft $26^c$, having a large gear wheel $27^c$ thereon. Intermeshing with this toothed wheel $27^c$ at each side thereof are pinions $28^c$, mounted on shafts $29^c$, which run to opposite sides of the horizontal rolls, and are provided with bevel gear connection $30^c$ with the lower ends of the side rolls. The bevel wheels on the shafts $29^c$ are splined thereto, so that they may be adjusted along these shafts when the inner housings are adjusted toward and from each other. The shaft $26^c$ of the toothed wheel $27^c$ has wabbler connection $31^c$ to a pinion stand $32^c$, containing pinions which drive the horizontal rolls in the ordinary manner. This four housing form of my mill is not the preferred form, as I prefer the simpler form, as shown in Figs. 1 to 11. It, however, presents another form of mill constructed in accordance with my invention.

The advantages of my invention will be obvious to those skilled in the art, since the difficulties heretofore incident to universal mills are overcome and positive rolling drives imparted by both vertical and side rolls, while proper adjustment is provided for. The strains and consequent weakness especially present in wide flanged beams, as heretofore rolled in universal mills, are reduced and overcome, owing to the positive rolling pressures of the side rolls. The beams are of substantially uniform quality throughout, thus giving an improved product. By varying the contour of the side rolls any shape and direction of flanges desired may be rolled.

I claim:

1. A universal mill having main rolls and a side roll whose axis is inclined to a plane through the axes of the other rolls; substantially as described.

2. A universal mill having main rolls, and side rolls whose axes are inclined to a plane through the axes of the other rolls; substantially as described.

3. A universal mill having main rolls, and two adjustable coöperating side rolls whose axes are inclined to a plane through the axes of the other rolls; substantially as described.

4. A universal mill having main rolls and side rolls whose axes are inclined to a plane through the axes of the other rolls, the intermediate portion of the side rolls being approximately in the center of the pass; substantially as described.

5. A universal mill having main rolls, and side rolls whose axes are inclined to a plane through the axes of the other rolls, and means for simultaneously adjusting the main rolls toward and from each other; substantially as described.

6. A universal mill having main rolls, and side rolls whose axes are inclined to a plane through the axes of the other rolls, and means for adjusting the side rolls; substantially as described.

7. A universal mill having main rolls, side rolls whose axes are inclined to a plane through the axes of the main rolls, means for adjusting the side rolls, and means for adjusting the main rolls simultaneously toward and from each other.

8. A universal mill having side rolls whose axes are inclined to a plane through the axes of the other rolls, positive driving connections for said side rolls, and means for simultaneously adjusting the horizontal rolls toward and from each other; substantially as described.

9. A universal mill having main rolls, and side rolls whose axes are inclined to a plane through the axes of the other rolls, said side rolls being of non-cylindrical contour; substantially as described.

10. A universal mill having main rolls and side rolls whose axes are inclined to a plane through the axes of the other rolls, said side rolls being of non-cylindrical contour, and connections arranged to positively drive the said rolls; substantially as described.

11. A universal mill having horizontal rolls with side collars to act on the flanges of a beam in combination with side rolls whose axes are inclined to a plane through the axes of the other rolls; substantially as described.

12. A universal mill having main rolls, side rolls whose axes are inclined to a plane through the axes of the other rolls, positive driving connections for said rolls, and means for adjusting the side rolls toward and away from the center of the pass; substantially as described.

13. A universal mill having horizontal rolls provided with collars arranged to engage the edges of the flanges and side rolls the axes of the side rolls being inclined to a plane through the axes of the other rolls; substantially as described.

14. A universal mill having main rolls, side rolls whose axes are inclined to a plane through the axes of the other rolls, positive driving connections for both the main rolls and the side rolls, and means for adjusting both sets of rolls; substantially as described.

15. A universal mill having horizontal rolls, and side rolls carried on housings the axes of said side rolls being inclined to a plane through the axes of the other rolls, and means for adjusting said housings toward and from each other; substantially as described.

16. A universal mill having horizontal rolls, and side rolls carried on housings, the axes of said side rolls being inclined to a plane through the axes of the other rolls, means for adjusting said housings toward and from each other, and means for adjusting the horizontal rolls toward and from each other; substantially as described.

17. A universal mill having rolls with end faces arranged to act on the flanges of a beam, in combination with side rolls whose axes are inclined to a plane through the axes of the other rolls; substantially as described.

18. In a universal mill, movable housings, means for adjusting said housings toward and from each other, and means for holding the horizontal rolls against movement during adjustment of the housings; substantially as described.

19. A universal mill having main rolls, and side rolls whose axes are inclined to a plane through the axes of the main rolls, driving connections for all the rolls, and means for adjusting both sets of rolls; substantially as described.

20. A housing for a universal mill having bearings for side rolls, supports for horizontal rolls, and mechanism for adjusting said housings toward and from each other; substantially as described.

21. A housing for a universal mill having an opening for the main rolls, and bearings for side rolls on opposite sides of said opening on one side of the housing; substantially as described.

22. A frame for a universal mill, comprising a bed, a plurality of housings movably mounted on said bed, said housings having openings for the main rolls, each of said housings having bearings on opposite sides of the opening on one side of the housing for side rolls, and means for adjusting said housings toward and from each other over the bed plate; substantially as described.

23. A universal mill having a plurality of housings, side rolls having bearings connected to said housings, a double chuck carrier supported from said housings, bearings for a horizontal roll connected to said chuck carrier, and means for moving the housings toward and from each other; substantially as described.

24. A universal mill having a plurality of housings, double chuck carriers supported on said housings, bearings for side rolls connected to said housings, means for adjusting said housings toward and from each other, and means for adjusting the double chuck carriers toward and from each other; substantially as described.

25. A universal rolling mill having a supporting frame, a plurality of housings movably mounted on said supporting frame, double chuck carriers connected to said housings, bearings for horizontal rolls supported from said double chuck carriers, bearings for side rolls connected to the housings, means for adjusting the housings toward and from each other, and links connected to said double chuck carriers and the frame; substantially as described.

26. The method of rolling flanged shapes, consisting in passing the metal between horizontal rolls, and simultaneously applying an unsymmetrical turning and spreading action alternately in opposite directions; substantially as described.

27. The method of rolling flanged shapes, which consists in passing a metal blank through a universal mill and simultaneously applying rolling pressures both vertically and horizontally thereto to reduce the thickness of the web and simultaneously increase the width of the flanges, and positively moving the shape by said rolling pressures; substantially as described.

28. The method of rolling flanged shapes consisting in passing metal through a universal mill and applying rolling pressures in directions approximately perpendicular to each other, one of said pressures being applied in a plane which is inclined to the plane of the other pressure; substantially as described.

29. The method of rolling flanged shapes, consisting in passing metal through a universal mill and applying rolling pressures in directions approximately perpendicular to each other, one of said pressures being applied in a plane which is inclined to the plane of the other pressure, and positively moving the shape by said rolling pressures.

In testimony whereof, I have hereunto set my hand.

JOHN C. CROMWELL.

Witnesses:
C. P. BYRNES,
H. M. CORWIN.